(12) United States Patent
Jinno et al.

(10) Patent No.: US 12,519,333 B2
(45) Date of Patent: Jan. 6, 2026

(54) BATTERY SYSTEM

(71) Applicant: HONDA MOTOR CO., LTD., Tokyo (JP)

(72) Inventors: Tatsuya Jinno, Wako (JP); Takumi Shiiyama, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 576 days.

(21) Appl. No.: 17/893,360

(22) Filed: Aug. 23, 2022

(65) Prior Publication Data

US 2022/0399737 A1    Dec. 15, 2022

Related U.S. Application Data

(63) Continuation of application No. PCT/JP2021/007871, filed on Mar. 2, 2021.

(30) Foreign Application Priority Data

Mar. 27, 2020    (JP) .................... 2020-057894

(51) Int. Cl.
    *H02J 7/00*    (2006.01)
    *B60L 58/16*    (2019.01)
    (Continued)

(52) U.S. Cl.
    CPC .......... *H02J 7/00712* (2020.01); *B60L 58/16* (2019.02); *H01M 10/425* (2013.01);
    (Continued)

(58) Field of Classification Search
    None
    See application file for complete search history.

(56) References Cited

U.S. PATENT DOCUMENTS 9,825,474 B2    11/2017    Tohara et al.
11,742,690 B2 *    8/2023    Kristjansson ......... H02J 7/0068
                                                        320/103
(Continued)

FOREIGN PATENT DOCUMENTS

CN    105027379 A    11/2015
JP    2016-152718 A    8/2016
(Continued)

OTHER PUBLICATIONS

International Search Report dated May 18, 2021, issued in counterpart Application No. PCT/JP2021/007871, with English translation (5 pages).

(Continued)

*Primary Examiner* — Kevin M Bernatz
(74) *Attorney, Agent, or Firm* — WHDA, LLP

(57) ABSTRACT

A battery system for supplying power to a load, the battery system comprising a plurality of batteries each including a battery unit and a management unit that manages a deterioration state of the battery unit, and a control unit that controls charging/discharging of each of the plurality of batteries, wherein the plurality of batteries are different from each other in deterioration states of battery units, and the control unit determines a distribution ratio representing a ratio of an amount of power to be supplied to the load by each of the plurality of batteries with respect to an amount of power to be supplied to the load, in accordance with the deterioration state of the battery unit managed by the management unit is provided.

6 Claims, 2 Drawing Sheets

(51) Int. Cl.
  *H01M 10/42* (2006.01)
  *H01M 10/44* (2006.01)
  *H01M 10/48* (2006.01)
  *H01M 50/204* (2021.01)

(52) U.S. Cl.
  CPC ....... *H01M 10/441* (2013.01); *H01M 10/482* (2013.01); *H01M 50/204* (2021.01); *H02J 7/0013* (2013.01); *H02J 7/005* (2020.01); *H02J 7/0063* (2013.01); *H01M 2010/4271* (2013.01); *H01M 2220/20* (2013.01)

(56) References Cited

U.S. PATENT DOCUMENTS

| | | | |
|---|---|---|---|
| 11,901,749 B2* | 2/2024 | Justin | H01M 10/425 |
| 2013/0030739 A1* | 1/2013 | Takahashi | G01R 31/392 |
| | | | 702/63 |
| 2014/0203780 A1* | 7/2014 | Hu | H02J 7/0013 |
| | | | 320/112 |
| 2015/0171641 A1 | 6/2015 | Sato | |
| 2016/0091573 A1* | 3/2016 | Shiraishi | G01R 31/389 |
| | | | 324/426 |
| 2017/0324256 A1* | 11/2017 | Mcmorrow | H02J 7/0069 |
| 2017/0366023 A1* | 12/2017 | Tanaka | H01M 10/425 |
| 2021/0159551 A1* | 5/2021 | Maeda | H01M 10/425 |
| 2022/0231515 A1* | 7/2022 | Bae | H02J 7/0048 |
| 2024/0077537 A1* | 3/2024 | Ma | B60L 58/10 |
| 2024/0085484 A1* | 3/2024 | Ma | G01R 31/3842 |
| 2025/0172627 A1* | 5/2025 | Qian | G01R 31/392 |

FOREIGN PATENT DOCUMENTS

| | | |
|---|---|---|
| JP | 2018-191500 A | 11/2018 |
| WO | 2013/129499 A1 | 9/2013 |
| WO | 2016/132586 A1 | 8/2016 |
| WO | 2019-186659 A1 | 10/2019 |

OTHER PUBLICATIONS

Office Action dated Aug. 12, 2025, issued in counterpart CN Application No. 202180015643.1, with English translation. (16 pages).

* cited by examiner

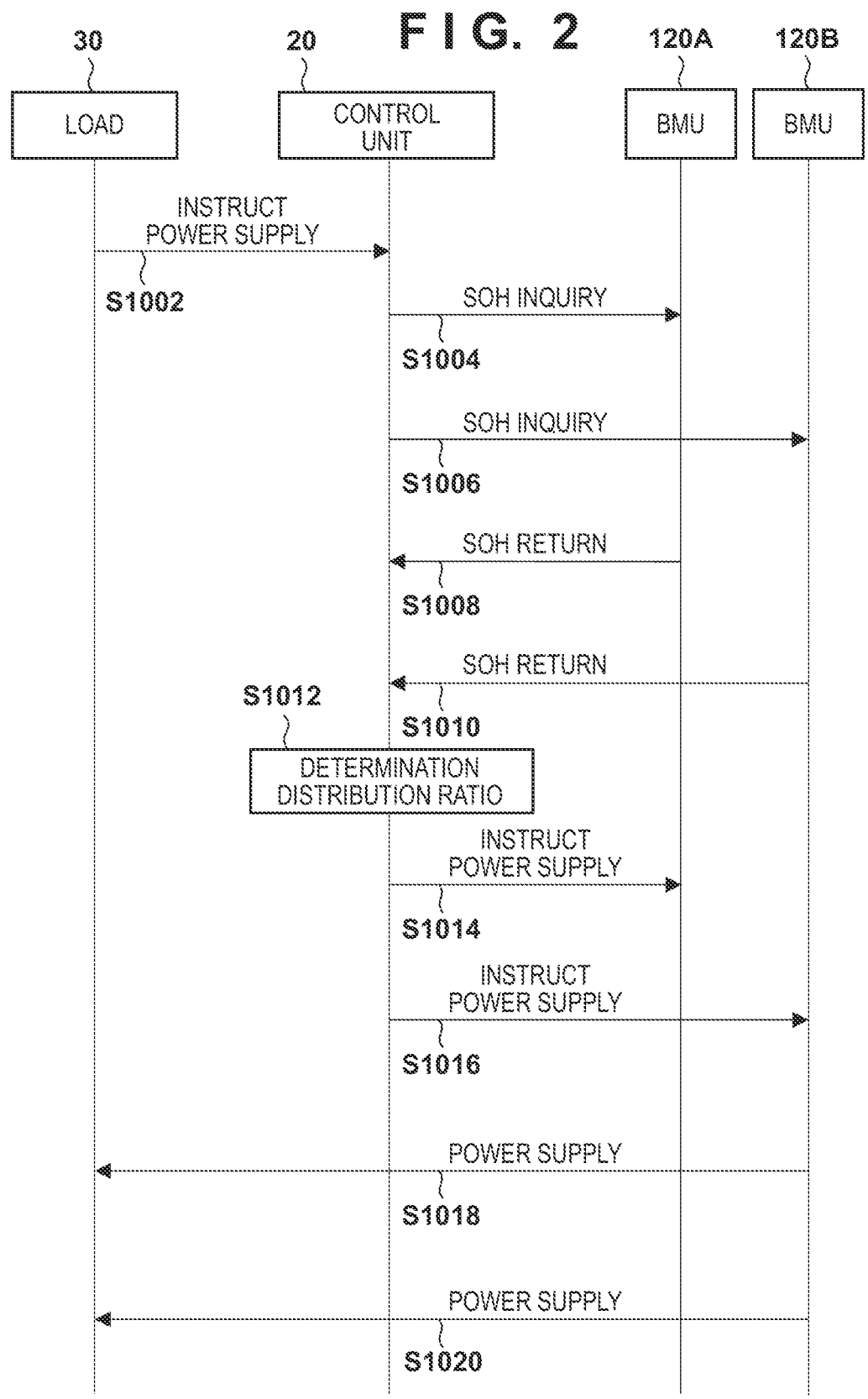

BATTERY SYSTEM

CROSS-REFERENCE TO RELATED APPLICATION(S)

This application is a continuation of International Patent Application No. PCT/JP2021/007871 filed on Mar. 2, 2021, the entire disclosures of which are incorporated herein by reference.

TECHNICAL FIELD

The present invention relates to a battery system.

BACKGROUND ART

In recent years, reuse of a battery (reuse battery) mounted on an electric vehicle or a hybrid vehicle, which have been spreading worldwide, has been studied. For example, reusing a reuse battery as a battery pack has been considered. Here, the battery pack is obtained by combining and packaging a plurality of single batteries of the same type (see PTL1).

CITATION LIST

Patent Literature

PTL1: Japanese Patent Laid-Open No. 2018-191500

SUMMARY OF INVENTION

Technical Problem

However, since deterioration states (hereinafter, referred to as "States Of Health (SOH)") of reuse batteries vary depending on the use environments and applications so far, electrical characteristics of the reuse batteries are different individually. Here, the SOH is an index indicating a degree of deterioration (soundness) of the battery, and is generally represented by "(currently (when deteriorated) full charging capacity (Ah)/initially full charging capacity (Ah))×100".

Therefore, when a plurality of reuse batteries are simply combined to form a battery pack, charging/discharging is controlled on the basis of the reuse battery having the lowest SOH, and therefore a reuse battery having a high SOH cannot achieve its original performance. Therefore, when the reuse batteries are combined to form a battery pack, it is necessary to select reuse batteries having substantially the same SOH, but such selection of reuse batteries is actually very difficult and not realistic.

The present invention provides new technology related to a battery system including a plurality of batteries having different deterioration states of battery units.

Solution to Problem

A battery system as one aspect of the present invention is a battery system for supplying power to a load, the battery system being characterized by comprising a plurality of batteries each including a battery unit and a management unit that manages a deterioration state of the battery unit, and a control unit that controls charging/discharging of each of the plurality of batteries, wherein the plurality of batteries are different from each other in deterioration states of battery units, the control unit determines a distribution ratio representing a ratio of an amount of power to be supplied to the load by each of the plurality of batteries with respect to an amount of power to be supplied to the load, in accordance with the deterioration state of the battery unit managed by the management unit, the deterioration state of the battery unit is represented by (current full charging capacity/initial full charging capacity)×100, the plurality of batteries include a first battery and a second battery having different deterioration states of the battery units, and when a value indicating the deterioration state of the battery unit included in the first battery is defined as SOH_A, a value indicating the deterioration state of the battery unit included in the second battery is defined as SOH_B, and SOH_A>SOH_B is satisfied, the control unit determines the distribution ratio such that the ratio of the first battery becomes SOH_A/(SOH_A+SOH_B) and the ratio of the second battery becomes SOH_B/(SOH_A+SOH_B).

Advantageous Effects of Invention

According to the present invention, for example, it is possible to provide new technology related to a battery system including a plurality of batteries having different deterioration states of battery units.

Other features and advantages of the present invention will become apparent from the following description with reference to the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 2 is a diagram for explaining an operation example of the battery system illustrated in FIG. 1.

DESCRIPTION OF EMBODIMENTS

Figure 1:
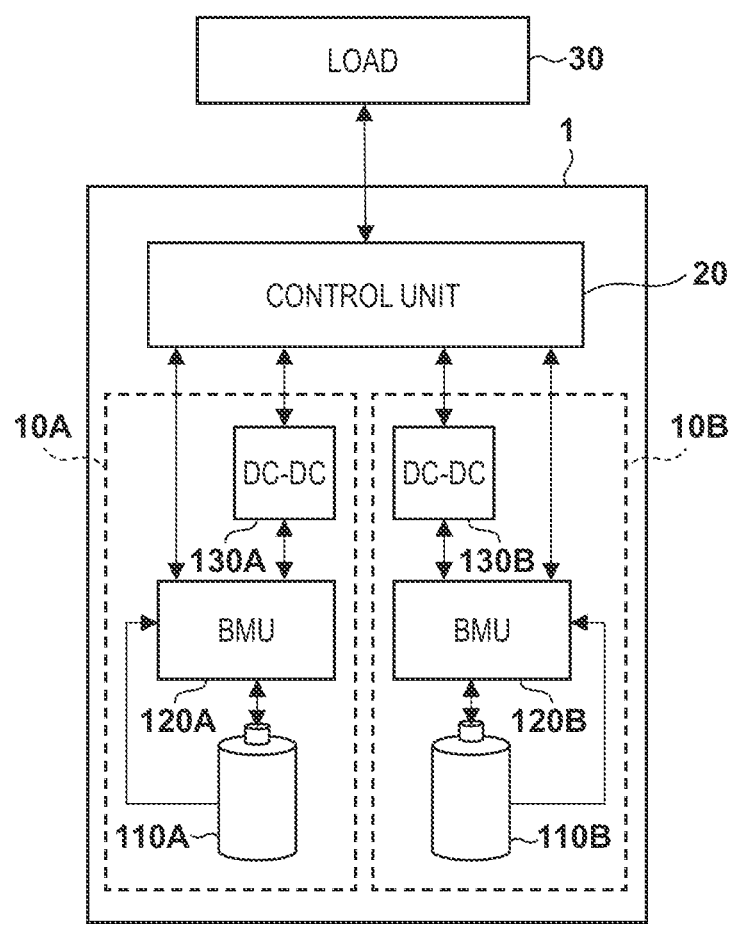
FIG. 1 is a schematic diagram illustrating a configuration of a battery system as one aspect of the present invention.

Hereinafter, embodiments will be described in detail with reference to the accompanying drawings. Note that the following embodiments do not limit the invention according to the claims, and not all combinations of features described in the embodiments are essential to the invention. Two or more of a plurality of the features described in the embodiments may be optionally combined together. In addition, identical or similar configurations are denoted by identical reference numerals, and overlapping descriptions will be omitted.

FIG. 1 is a schematic diagram illustrating a configuration of a battery system 1 as one aspect of the present invention. The battery system 1 is configured as a battery pack in which a plurality of single batteries of the same type are combined and packaged. As illustrated in FIG. 1, the battery system 1 is a system that has a first battery 10A, a second battery 10B, and a control unit 20, and supplies power to a load 30 such as an electronic device.

In the present embodiment, a case where the battery system 1 has two batteries of the first battery 10A and the second battery 10B as a plurality of batteries will be described as an example. However, the number of batteries included in the battery system 1 is not limited to two, and the battery system 1 may include three or more batteries.

The first battery 10A is a battery (single battery) that stores power supplied from a power system including a power supply facility such as a power company or a power generation device. The first battery 10A includes a battery unit 110A, a battery management unit (BMU) 120A, and a DC-DC converter 130A.

The battery unit 110A stores power supplied from a power system or a power generation device, and includes, for example, a secondary battery such as a lithium ion. The power stored in the battery unit 110A is supplied (discharged) to a load 30 such as an electronic device under the control of the BMU 120A and/or the control unit 20.

The BMU 120A includes a CPU, a memory, and the like, and has a function of controlling the battery unit 110A. The BMU 120A controls charging/discharging in the battery unit 110A so as not to cause overcharging or overdischarging on the basis of detection values of various sensors such as a voltage sensor, a current sensor, and a temperature sensor. In addition, in the present embodiment, the BMU 120A also functions as a management unit that manages a deterioration state of the battery unit 110A. Here, the deterioration state of the battery unit 110A is represented by (currently (when deteriorated) full charging capacity (Ah)/initially full charging capacity (Ah))×100, and is hereinafter referred to as SOH (States Of Health).

The DC-DC converter 130A includes, for example, a step-down converter, a step-up converter, and the like, and has a function of converting a level of a DC voltage.

The second battery 10B is a battery (single battery) that stores power supplied from a power system including a power supply facility such as a power company or a power generation device. The second battery 10B basically has a configuration similar to that of the first battery 10A, and includes a battery unit 110B, a battery management unit (BMU) 120B, and a DC-DC converter 130B. Note that since the battery unit 110B, the BMU 120B, and the DC-DC converter 130B have functions similar to those of the battery unit 110A, the BMU 120A, and the DC-DC converter 130A, respectively, detailed description thereof is omitted here.

The first battery 10A and the second battery 10B are batteries of the same type having the same input/output specifications. Specifically, in the present embodiment, a reuse battery which is a battery mounted on a vehicle traveling with an electric motor as a power source, such as an electric vehicle or a hybrid vehicle, and which reuses a battery that supplies power to the electric motor is used as the first battery 10A and the second battery 10B. As illustrated in FIG. 1, the BMU and the DC-DC converter are generally mounted (incorporated) in the reuse battery of the vehicle in advance. Therefore, reusing the reuse battery of the vehicle as the battery is advantageous in terms of cost and environment as compared with a case where a battery including the BMU and the DC-DC converter is newly prepared. In addition, not only the BMU and the DC-DC converter but also various sensors such as a voltage sensor, a current sensor, and a temperature sensor are mounted in advance in the reuse battery of the vehicle. However, the first battery 10A and the second battery 10B are not limited to a vehicle reuse battery, and may be a battery in which a unit (for example, the BMU) functioning as a management unit that manages at least a deterioration state of the battery unit is mounted.

The control unit 20 includes, for example, a computer (information processing apparatus) including a CPU, a memory, and the like, and executes a program stored in a storage unit. In the present embodiment, the control unit 20 controls charging/discharging of each of a plurality of batteries included in the battery system 1, that is, the first battery 10A and the second battery 10B. The control unit 20 is also provided with an AC-DC converter that converts the direct current output from the DC-DC converters 130A and 130B into a stable alternating current having a predetermined frequency so as to be able to be used by the load 30 which may be an electronic device.

In the battery system 1, as described above, since vehicle reuse batteries are used as the first battery 10A and the second battery 10B, the SOH of the battery unit 110A and the SOH of the battery unit 110B are not necessarily the same. In other words, the SOH of each of the battery units 110A and 110B varies depending on the use environment and application of the first battery 10A and the second battery 10B so far. In such a case, in the conventional technology, since charging/discharging is controlled on the basis of the battery (battery unit) having the lowest SOH, the performance of the battery system (battery pack) as a whole is limited to the performance of the battery having the lowest SOH, and the performance of the battery having the high SOH cannot be sufficiently achieved.

Therefore, in the present embodiment, new technology related to a battery system including a plurality of batteries having different deterioration states of battery units, specifically, technology for improving the performance of the battery system as a whole by utilizing a battery having the high SOH without being limited to the performance of a battery having the lowest SOH is provided.

Hereinafter, an operation example of the battery system 1 in the present embodiment will be described with reference to FIG. 2. FIG. 2 is a diagram schematically illustrating an operation (processing) between the load 30 and the battery system 1, specifically, an operation between the load 30, the control unit 20, and the BMUs 120A and 120B.

Here, it is assumed that a value representing the SOH of the battery unit 110A included in the first battery 10A is managed by the BMU 120A as SOH_A, and a value representing the SOH of the battery unit 110B included in the second battery 10B is managed by the BMU 120B as SOH_B. In addition, it is assumed that the value SOH_A indicating the SOH of the battery unit 110A is larger than the value SOH_B indicating the SOH of the battery unit 110B (SOH_A>SOH_B), and the battery unit 110B is more deteriorated than the battery unit 110A.

Referring to FIG. 2, first, a power supply instruction to request power supply is issued from the side of the load 30 which may be an electronic device to the control unit 20 (S1002). At this time, the control unit 20 also acquires an amount of power required by the load 30, that is, an amount of power P to be supplied to the load 30 in accordance with the power supply instruction from the side of the load 30.

Next, the control unit 20 inquires of the BMU 120A of the first battery 10A about the deterioration state of the battery unit 110A, that is, (the value representing) the SOH of the battery unit 110A managed by the BMU 120A (S1004). Similarly, the control unit 20 inquires of the BMU 120B of the second battery 10B about the deterioration state of the battery unit 110B, that is, (the value representing) the SOH of the battery unit 110B managed by the BMU 120B (S1006). Although FIG. 2 illustrates that the operations are performed in the order of S1004 and S1006, the operations may be performed in the order of S1006 and S1004, or the operations of S1004 and S1006 may be performed in parallel.

Next, the BMU 120A of the first battery 10A returns the SOH of the battery unit 110A managed by itself in response to the inquiry (S1004) from the control unit 20 (S1008). In the present embodiment, the BMU 120A returns the value SOH_A representing the SOH of the battery unit 110A to the control unit 20. Similarly, the BMU 120B of the second battery 10B returns the SOH of the battery unit 110B managed by itself in response to the inquiry (S1006) from the control unit 20 (S1010). In the present embodiment, the BMU 120B returns the value SOH_B representing the SOH of the battery unit 110B to the control unit 20.

Next, the control unit 20 determines a distribution ratio representing a ratio of the amount of power to be supplied to the load 30 by each of the first battery 10A and the second battery 10B with respect to the amount of power P to be supplied to the load 30, on the basis of the value SOH_A representing the SOH of the battery unit 110A and the value SOH_B representing the SOH of the battery unit 110B (S1012). For example, the control unit 20 determines the distribution ratio representing the ratio of the amount of power to be supplied to the load 30 by each of the first battery 10A and the second battery 10B such that the ratio of the amount of power to be supplied to the load 30 becomes smaller the more the deterioration of the battery has progressed among the plurality of batteries included in the battery system 1, in the present embodiment, such that the ratio of the amount of power to be supplied to the load 30 by the second battery 10B becomes smaller than the ratio of the amount of power to be supplied to the load 30 by the first battery 10A. Specifically, the control unit 20 determines the distribution ratio representing the ratio of the amount of power to be supplied to the load 30 by each of the first battery 10A and the second battery 10B such that the ratio of the amount of power to be supplied to the load 30 by the first battery 10A becomes SOH_A/(SOH_A+SOH_B) and the ratio of the amount of power to be supplied to the load 30 by the second battery 10B becomes SOH_B/(SOH_A+SOH_B).

Next, the control unit 20 instructs the first battery 10A to supply power to the load 30. In the present embodiment, the control unit 20 issues a power supply instruction to request the supply of power to the load 30 in an amount of power $P_A$ (=P×SOH_A/(SOH_A+SOH_B)) determined from the distribution ratio determined in S1012 (S1014). Similarly, the control unit 20 instructs the second battery 10B to supply power to the load 30. In the present embodiment, the control unit 20 issues a power supply instruction to request the supply of power to the load 30 in an amount of power $P_B$ (=P×SOH_B/(SOH_A+SOH_B)) determined from the distribution ratio determined in S1012 (S1016).

Next, the BMU 120A of the first battery 10A supplies power from the battery unit 110A to the load 30 in response to the power supply instruction (S1014) from the control unit 20 (S1018). In the present embodiment, the BMU 120A controls discharging in the battery unit 110A such that power of the amount of power $P_A$ (=P×SOH_A/(SOH_A+SOH_B)) is output from the battery unit 110A. Similarly, the BMU 120B of the second battery 10B supplies power from the battery unit 110B to the load 30 in response to the power supply instruction (S1016) from the control unit 20 (S1020). In the present embodiment, the BMU 120B controls discharging in the battery unit 110B such that power of the amount of power $P_B$ (=P×SOH_B/(SOH_A+SOH_B)) is output from the battery unit 110B. As a result, $P_A+P_B$ (=P), which is the sum of the amount of power $P_A$ supplied from the first battery 10A and the amount of power $P_B$ supplied from the second battery 10B, is supplied to the load 30, so that the amount of power P to be supplied to the load 30 as a whole of the battery system 1 is supplied.

As described above, in the present embodiment, the distribution ratio representing the ratio of the amount of power to be supplied to the load 30 by each of the first battery 10A and the second battery 10B with respect to the amount of power to be supplied to the load 30 is appropriately determined in accordance with the deterioration state (SOH_A and SOH_B) of each of the battery units 110A and 110B. As a result, in the battery system 1, the first battery 10A in which the deterioration of the battery unit 110A has not progressed as much can assist the second battery 10B in which the deterioration of the battery unit 110B has progressed more (that is, the first battery 10A shares the output of the second battery 10B). Therefore, in the battery system 1, the performance is not limited to the performance of the second battery 10B, and the first battery 10A can also be utilized to improve the performance as a whole.

In addition, in the present embodiment, since it is not necessary to select a battery having substantially the same deterioration state of the battery unit, the burden (specifically, measurement of a deterioration state of the battery unit before reuse or the like) at the time of reusing a reuse battery is greatly reduced, and the use of reuse batteries can be promoted.

In addition, determining the distribution ratio representing the ratio of the amount of power to be supplied to the load 30 by each of the plurality of batteries included in the battery system 1 such that the ratio of the amount of power to be supplied to the load 30 becomes smaller the more the deterioration of the battery unit of the battery has progressed can also be said to be determining the distribution ratio such that the deterioration state of the battery unit is equalized among the plurality of batteries. As described above, the deterioration state of the battery unit is equalized among the plurality of batteries, so that it is possible to extend the life assumed as the entire battery system 1 as compared with the conventional technology.

Note that in the present embodiment, a case of using a reuse battery reusing a battery mounted on an electric vehicle or a hybrid vehicle has been described as an example, but the present invention is not limited thereto. For example, it is also possible to use a mobile power pack (MPP) used in an electric scooter (electric motorcycle).

Summary of Embodiment

1. The battery system of the above embodiment
   is a battery system (for example, 1) for supplying power to a load, (for example, 30) the battery system being characterized by comprising:
   a plurality of batteries (for example, 10A, 10B) each including a battery unit (for example, 110A, 110B) and a management unit (for example, 120A, 120B) that manages a deterioration state of the battery unit; and
   a control unit (for example, 20) that controls charging/discharging of each of the plurality of batteries, wherein
   the plurality of batteries are different from each other in deterioration states of battery units,
   the control unit determines a distribution ratio representing a ratio of an amount of power to be supplied to the load by each of the plurality of batteries with respect to an amount of power to be supplied to the load, in accordance with the deterioration state of the battery unit managed by the management unit,
   the deterioration state of the battery unit (for example, 110A, 110B) is represented by (current full charging capacity/initial full charging capacity)×100, the plurality of batteries include a first battery (for example, 10A) and a second battery (for example, 10B) having different deterioration states of the battery units, and when a value indicating the deterioration state of the battery unit (for example, 110A) included in the first battery is defined as SOH_A, a value indicating the deterioration state of the battery unit (for example, 110B) included in the second battery is defined as SOH_B, and SOH_A>SOH_B is satisfied, the control unit (for example, 20) determines the distribution ratio such that the ratio of the first battery becomes SOH_A/(SOH_A+SOH_B) and the ratio of the second battery becomes SOH_B/(SOH_A+SOH_B).

According to this embodiment, the performance of the battery system as a whole can be improved. In addition, according to this embodiment, the life assumed as the entire battery system can be extended.

2. The battery system (for example, 1) of the above embodiment, characterized in that the control unit (for example, 20) determines the distribution ratio such that the ratio becomes smaller in a case of a battery in which the deterioration of the battery unit progresses among the plurality of batteries (for example, 10A, 10B), on the basis of the deterioration state of the battery unit (for example, 110A, 110B) managed by the management unit (for example, 120A, 120B).

According to this embodiment, the performance of the battery system as a whole can be improved.

3. The battery system (for example, 1) of the above embodiment, characterized in that the control unit (for example, 20) determines the distribution ratio such that the deterioration state of the battery unit (for example, 110A, 110B) managed by the management unit (for example, 120A, 120B) is equalized among the plurality of batteries.

According to this embodiment, the performance of the battery system as a whole can be improved.

4. The battery system (for example, 1) of the above embodiment, characterized in that the plurality of batteries (for example, 10A, 10B) are reuse batteries that are mounted on a vehicle traveling with an electric motor as a power source, and reuse batteries having supplied power to the electric motor.

According to this embodiment, it is advantageous in terms of cost and environment as compared with a case where a battery including a management unit that manages a deterioration state of a battery unit is newly prepared.

The present invention is not limited to the above-described embodiments, and various changes and modifications can be made without departing from the spirit and scope of the present invention. Therefore, in order to make the scope of the present invention public, the following claims are attached.

The invention claimed is:

1. A battery system for supplying power to a load, the battery system comprising:

a plurality of batteries each including a battery unit and a management unit that manages a deterioration state of the battery unit; and a control unit that controls charging/discharging of each of the plurality of batteries, wherein deterioration states of a plurality of the battery units included in each of the plurality of batteries are different from each other, the control unit obtains the deterioration state of each of the plurality of batteries, determines a distribution ratio representing an amount of power to be supplied to the load by each of the plurality of batteries with respect to a total amount of power to be supplied to the load, in accordance with the deterioration state of the battery unit managed by the management unit, and instructs each of the plurality of batteries to discharge in accordance with the distribution ratio determined, the deterioration state of the battery unit is represented by (current full charging capacity/initial full charging capacity)×100, and the total amount power to be supplied to the load is represented by P, the plurality of batteries include at least a first battery and a second battery, a first battery unit which is the battery unit included in the first battery and a second battery unit which is the battery unit included in the second battery having different deterioration states, and when a value indicating the deterioration state of the first battery unit included in the first battery is defined as SOH_A, a value indicating the deterioration state of the second battery unit included in the second battery is defined as SOH_B, and SOH_A>SOH_B is satisfied, the control unit determines the distribution ratio so that a first amount of power which is an amount of power to be supplied to the load by the first battery becomes P×SOH_A/(SOH_A+SOH_B) and a second amount of power which is an amount to be supplied to the load by the second battery becomes P×SOH_B/(SOH_A+SOH_B).

2. The battery system according to claim 1, wherein the control unit determines the distribution ratio so that the amount of power to be supplied to the load becomes smaller from the second battery in which the deterioration of the battery unit progresses among the plurality of batteries, on the basis of the deterioration state of the battery unit managed by the management unit.

3. The battery system according to claim 1, wherein the control unit determines the distribution ratio so that the deterioration state of the battery unit managed by the management unit comes to be equal among the plurality of batteries.

4. The battery system according to claim 1, wherein the plurality of batteries are reuse batteries that are mounted on a vehicle traveling with an electric motor as a power source, and the reuse batteries having supplied power to the electric motor.

5. A control method of a battery system for supplying power to a load, comprising:

controlling charging/discharging of each of a plurality of batteries each including a battery unit and a management unit that manages a deterioration state of the battery unit, wherein deterioration states of a plurality of the battery units included in each of the plurality of batteries are different from each other, the controlling obtains the deterioration state of each of the plurality of batteries, determines a distribution ratio representing an amount of power to be supplied to the load by each of the plurality of batteries with respect to a total amount of power to be supplied to the load, in accordance with the deterioration state of the battery unit managed by the management unit, and instructs each of the plurality of batteries to discharge in accordance with the distribution ratio determined, the deterioration state of the battery unit is represented by (current full charging capacity/initial full charging capacity)×100, and the total amount power to be supplied to the load is represented by P, the plurality of batteries include at least a first battery and a second battery, a first battery unit which is the battery unit included in the first battery and a second battery unit which is the battery unit included in the second battery having different deterioration states, and when a value indicating the deterioration state of the first battery unit included in the first battery is defined as SOH_A, a value indicating the deterioration state of the second battery unit included in the second battery is defined as SOH_B, and SOH_A>SOH_B is satisfied, the controlling determines the distribution ratio so that a first amount of power which is an amount power to be supplied to the load by the first battery becomes P×SOH_A/(SOH_A+SOH_B) and a second amount of power which is an amount power to be supplied to the load by the second battery becomes P×SOH_B/(SOH_A+SOH_B).

6. A non-transitory computer-readable storage medium storing a program configured to cause a computer to execute a control method defined in claim 5.

\* \* \* \* \*